US000002047P2

(19) United States

(12) Statutory Invention Registration

Harrison et al.

(10) Reg. No.: US H2047 H

(43) Published: Sep. 3, 2002

(54) REINFORCEMENT LAMINATE

(75) Inventors: Bruce Lee Harrison, Sterling Heights; George F. Didlake, Troy, both of MI (US)

(73) Assignee: Henkel Corporation, Gulph Mills, PA (US)

(21) Appl. No.: 09/437,395

(22) Filed: Nov. 10, 1999

(51) Int. Cl.[7] ..... B32B 27/04

(52) U.S. Cl. ..... 428/297.4; 428/299.7

(56) References Cited

U.S. PATENT DOCUMENTS

| | | | | |
|---|---|---|---|---|
| 3,756,984 | A | 9/1973 | Klaren et al. | 260/47 |
| 4,066,625 | A | 1/1978 | Bolger | 260/59 |
| 4,077,921 | A | 3/1978 | Sharpe et al. | 260/2.5 |
| 4,206,299 | A | 6/1980 | Yamazaki et al. | 528/288 |
| 4,268,656 | A | 5/1981 | Ray-Chaudhuri et al. | 528/103 |
| 4,360,649 | A | 11/1982 | Kamio et al. | 525/484 |
| 4,401,499 | A | 8/1983 | Kaneko et al. | 156/307.3 |
| 4,542,202 | A | 9/1985 | Takeuchi et al. | 528/96 |
| 4,546,155 | A | 10/1985 | Hirose et al. | 525/504 |
| 4,600,745 | A | 7/1986 | Creighton | 524/534 |
| 4,613,660 | A | 9/1986 | Goel et al. | 528/73 |
| 4,751,249 | A | 6/1988 | Wycech | 521/54 |
| 4,769,391 | A | 9/1988 | Wycech | 521/54 |
| 4,824,512 | A | 4/1989 | Kohlstadt | 156/334 |
| 4,836,516 | A | 6/1989 | Wycech | 267/279 |
| 4,843,119 | A | 6/1989 | Schapira et al. | 524/730 |
| 4,853,270 | A | 8/1989 | Wycech | 428/68 |
| 4,861,097 | A | 8/1989 | Wycech | 52/810 |
| 4,901,500 | A | 2/1990 | Wycech | 52/793 |
| 4,908,930 | A | 3/1990 | Wycech | 29/527.2 |
| 4,922,596 | A | 5/1990 | Wycech | 29/897.2 |
| 4,923,902 | A | 5/1990 | Wycech | 521/54 |
| 4,962,138 | A | 10/1990 | Kimball | 523/428 |
| 4,978,562 | A | 12/1990 | Wycech | 428/35.8 |
| 4,995,545 | A | 2/1991 | Wycech | 228/119 |
| 5,079,094 | A | 1/1992 | Kimball | 428/416 |
| 5,124,186 | A | 6/1992 | Wycech | 428/35.8 |
| 5,134,239 | A | 7/1992 | Bertram et al. | 546/112 |
| 5,149,742 | A | 9/1992 | Hemel et al. | 525/124 |
| 5,202,391 | A | 4/1993 | Yamazaki et al. | 525/438 |
| 5,256,738 | A | 10/1993 | Chasser et al. | 525/330.9 |
| 5,356,994 | A | 10/1994 | Koch | 525/98 |
| 5,407,978 | A | 4/1995 | Bymark et al. | 523/457 |
| 5,430,112 | A | 7/1995 | Sakata et al. | 525/526 |
| 5,439,977 | A | 8/1995 | Yokota et al. | 525/113 |
| 5,464,910 | A | 11/1995 | Nakatsuka et al. | 525/486 |
| 5,543,486 | A | 8/1996 | Abe et al. | 528/92 |
| 5,548,058 | A | 8/1996 | Muroi et al. | 528/93 |
| 5,575,526 | A | 11/1996 | Wycech | 296/205 |
| 5,717,011 | A | 2/1998 | Griggs et al. | 523/414 |
| 5,733,954 | A | 3/1998 | McKenzie et al. | 523/414 |
| 5,755,486 | A | 5/1998 | Wycech | 296/188 |
| 5,766,719 | A | 6/1998 | Rimkus | 428/71 |
| 5,789,498 | A | 8/1998 | Ohnishi et al. | 525/526 |
| 5,798,399 | A | 8/1998 | Griggs et al. | 523/414 |
| 5,801,218 | A | 9/1998 | McKenzie et al. | 523/414 |
| 5,884,960 | A | 3/1999 | Wycech | 296/146.6 |
| 5,888,600 | A | 3/1999 | Wycech | 428/35.9 |

FOREIGN PATENT DOCUMENTS

| | | |
|---|---|---|
| EP | 0097394 | 1/1984 |
| EP | 0309903 | 4/1989 |
| EP | 0891918 | 1/1999 |
| EP | 0893331 | 1/1999 |
| EP | 0893332 | 1/1999 |
| WO | WO 9203514 | 5/1992 |
| WO | WO 9623040 | 8/1996 |
| WO | WO 9743501 | 11/1997 |
| WO | WO 9908854 | 2/1999 |
| WO | WO 9950057 | 10/1999 |

*Primary Examiner*—Michael J. Carone
*Assistant Examiner*—Aileen J. Baker
(74) *Attorney, Agent, or Firm*—Wayne C. Jaeschke; Stephen D. Harper

(57) ABSTRACT

A thermosettable adhesive is used to secure a laminate having a compliant layer (for example, a foamable composition containing a diene rubber), a layer comprised of a thermosettable resin capable of being cured to a rigid state, and an optional carrier layer (for example, a metal foil) to a substrate for the purpose of strengthening, stiffening, or otherwise reinforcing the substrate. The substrate may, for example, be a metal vehicle door. The thermosettable adhesive is comprised of at least one polyol such as a polyether polyol, at least one epoxy resin, and at least one polyisocyanate.

64 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

REINFORCEMENT LAMINATE

BACKGROUND OF THE INVENTION

In a number of applications, light-weight, high strength structural members are required. For example, in motor vehicles and aircraft as well as in various devices such as home appliances and the like, a number of composite materials have been proposed in the past as structural members, such as exotic light-weight alloys. In most applications, however, mass reduction must be balanced against the cost of the product to the consumer. Thus, there is a need for providing strength without significantly increasing material and labor costs. Moreover, reinforcement techniques are needed which can be easily adapted to existing geometries of structural parts, thereby obviating any requirement for fundamental design changes.

It would be desirable to provide a structural member which may be generally considered as a wall with some form of reinforcement. While such forms of reinforcement could have numerous applications, it would be particularly desirable to provide such reinforcements for door panels, roofs, and hoods of vehicles.

A typical motor vehicle door includes an outer skin or panel of thin steel or aluminum. The outer panel is attached to structural members and, along with an inner door panel, defines a space or cavity into which a moveable window retracts. In addition to the moveable window a number of latch fixtures and window actuators are located in this door space.

Due to the large surface area of the outer panel and the thinness of the sheet metal normally used, a phenomenon as "oil-canning" may occur. As applied to an outer door panel, oil-canning refers to the tendency of the door panel to flex from its desired position (often typically bowed) to a second, undesired position in which the outer panel is deformed or flexed inwardly toward the inner door panel. This movement may occur in response to slight pressures on the outer panel such as the weight of an individual leaning against the vehicle.

Although the oil-canning may be momentary with the panel immediately returning to its original configuration, it may be permanent and, moreover, may cause a crease to form in the panel coating. As will be understood by those in the art, creases of this kind must be removed in a body shop or the like and require that the panel be repainted.

While a number of side impact beams are known, these beams focus on the structural integrity of the motor vehicle in a crash and are not directed to the oil-canning problem. For example, a side impact beam for a vehicle door has been proposed in U.S. Pat. No. 4,978,562 which comprises an open channel-shaped metal member having a longitudinal cavity which is filled with a thermoset or thermoplastic resin-based material core. The core is disposed in the midspan of the beam. The core does not adhere to the sides of the beam. The core may include hollow glass microspheres in order to decrease density and thus weight.

Although filling large volumes of a door cavity with a foam could prevent oil-canning, such an approach would also significantly increase mass and thus weight, which, of course, is an undesirable feature. In addition, large volumes of foam contribute significantly to cost. Finally, a large foam core often creates an unwanted heat sink. And, although increasing the metal gauge of the door panel or adding localized thick metal reinforcements will increase stiffness, as the metal thickness increases weight increases.

Accordingly, there is a need for a lightweight door panel stiffener which is economical to produce and install. Such stiffeners are desirable for door panels in general even when not intended to address the oil-canning phenomenon.

The conventional method of stiffening outer automotive body panels involves placing a sheet of thermosettable polymer on the inside of a panel and then heat curing the thermosettable polymer in a paint oven. The conventional heat cured stiffener is applied as a wallpaper sheet type applique or as a sprayed-on layer. The applique is provided in a single or double layer sheet. The main layer is a thermosettable layer with or without a backing. Where a backing is used, the backing can be fiberglass cloth, metal screen, or foil. The spray-on is a single polymer layer without a backing. The polymer layer is generally 0.020 to 0.100 inches thick.

When the vehicle doors are painted, there often is a problem with paint read-through once the outer metal body panel stiffened with the thermoset polymer sheet has been heat cured. That is, the painted outer surface of the vehicle door becomes somewhat distorted as a result of the shrinkage of the thermoset polymer which takes place upon curing, thereby marring the appearance of the painted door. It would be desirable if techniques could be provided to eliminate or reduce the paint read-through problem.

Any stiffener which is to be applied to a metal body panel must be capable of adhering strongly and permanently to the body panel without delamination. This is often difficult to achieve in practice, however, as the surfaces of such body panels tend to be coated with oil or other substances which interfere with adhesion. Although the body panel surface can be degreased through the use of solvents or the like, this introduces an additional step to the production process and creates waste (i.e., used solvent or oily rags) which must then be disposed of.

SUMMARY OF THE INVENTION

A laminate useful for reinforcing or stiffening body panels is provided which includes three polymeric layers. One of the polymeric layers is a compliant layer comprised of flexible, pliable polymer which is adhered to the substrate or structural member being reinforced using a reactive thermosettable adhesive comprised of at least one polyol, at least one epoxy resin, and at least one polyisocyanate. Thermosettable adhesives of this type have been found to provide a high strength bond between the laminate and the substrate, even where the substrate surface is coated with oil or other greasy substanes. A rigid layer comprised of a thermoset resin is secured to the other side of the compliant layer. The rigid layer improves the resistance of the substance against bending or flexing. A carrier, such as a foil or fiberglass backing, may be secured to the outer surface of the rigid layer. The laminates of the present invention have the further advantage of dampening acoustic and other vibrations, thereby reducing the level of noise in the interior of a vehicle having panels reinforced with such laminates.

DETAILED DESCRIPTION

Figure 1:
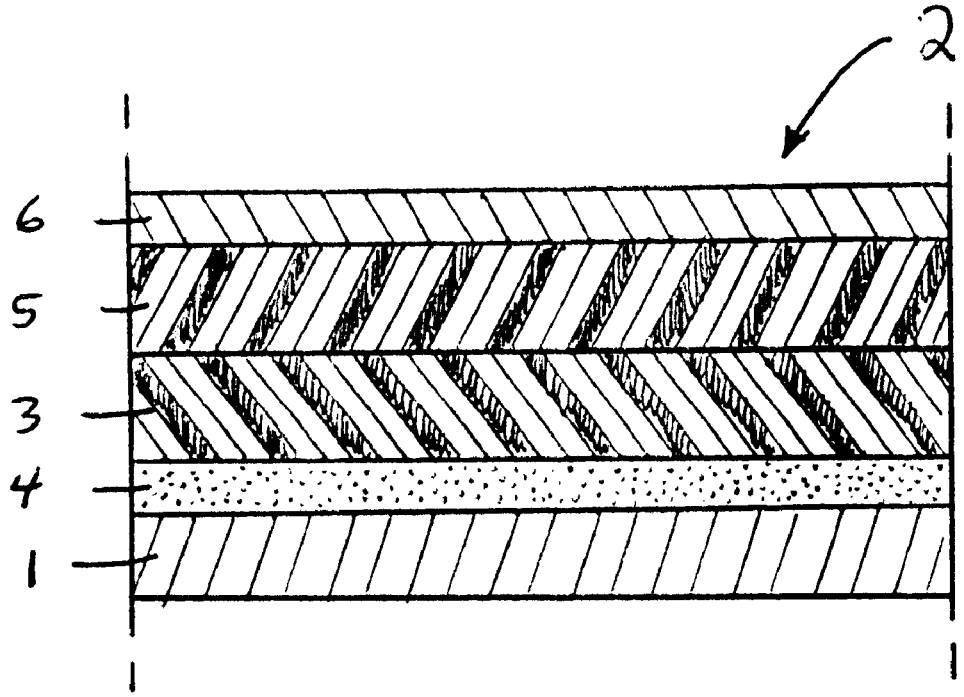
FIG. 1 is a cross-sectional view in elevation of a laminate in accordance with this invention.
Figure 2:
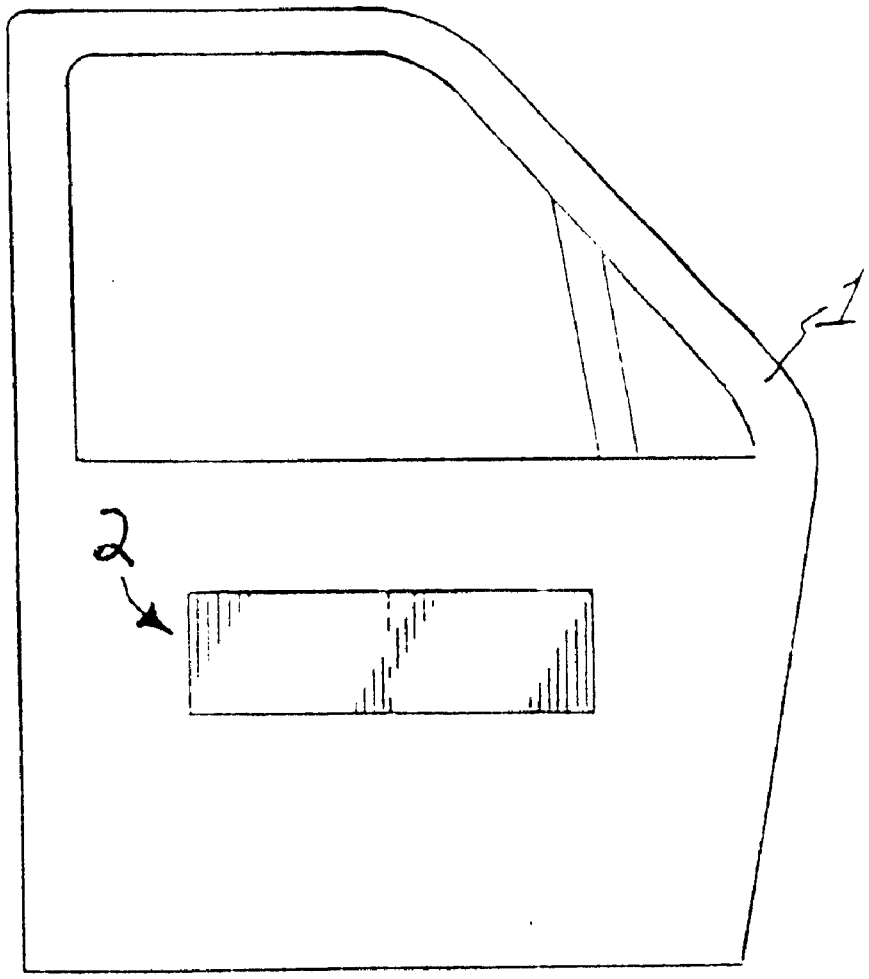
FIG. 2 is a perspective view showing the laminate of FIG. 1 used as a body panel stiffener in an automobile door application.

FIG. 1 illustrates a laminate 2 in accordance with this invention. As shown therein a compliant layer 3 is adhered to the substrate 1 through an adhesive layer 4. As will be subsequently explained in more detail, adhesion of the compliant layer to the substrate is significantly enhanced through the use of an epoxy resin/polyol/polyisocyanate-based adhesive in layer 4, particularly where the surface of the substrate is oily. A rigid layer 5 is applied against the compliant layer 3. FIG. 1 also illustrates a carrier layer 6 on the outer surface of rigid layer 5. This results in a laminated body panel stiffener 4.

When the thermosettable resin used to form rigid layer 5 cures, the compliant layer 3 helps to shield the shrinkage strains resulting from rigid layer 5 from the substrate 1 because it is not rigid after cure. Layer 5 is rigid after cure but its shrinkage strains are blocked from getting to the substrate by the compliant layer 3. Carrier layer 6 is used to provide additional stiffness or reinforcement. When the rigid layer 5 is formed from a thermosettable resin comprised of relatively low molecular weight and/or liquid components, carrier layer 6 may provide the additional benefit of rendering the outside surface of the uncured laminate (sometimes referred to hereinafter as a "laminate preform") less tacky and thus easier to handle and apply to the substrate. Another advantage of utilizing a carrier layer is that it acts to constrain a foamable thermosettable resin formulation during expansion and curing so that the thickness of the resulting rigid layer in the laminate is more uniform than may be the case in the absence of the carrier layer.

The compliant layer 3 absorbs shrinkage strains due to the cure of the layer 5. Large shrinkage strains of the rigid layer 5 are not transferred to the substrate 1 but yet the rigid layer 5 with its carrier 6 will stiffen the substrate. Typical layer thicknesses are from about 0.1 to about 6 mm (preferably, about 1 to about 4 mm) for compliant layer 3 and about 0.1 to about 10 mm (preferably, about 0.5 to about 4 mm) for rigid layer 5 with carrier layer 6 having a thickness of about 0.01 to about 0.50 mm (preferably, about 0.05 to about 0.2 mm). Generally speaking, adhesive layer 4 will be about 0.05 mm to about 2 mm (preferably, about 0.1 to about 0.5 mm) thick. Any suitable materials may be used for layers 3 and 5. Both polymeric layers should be compatible in chemistry, however, otherwise the properties of the cured finished laminate will be compromised. The specific materials are not critical provided they function in the intended manner, namely, in that the layer 3 would be compliant while the layer 5 would have rigidity once cured.

In one embodiment of the invention, rigid layer 5 is obtained by curing of a thermosettable resin which in its uncured state is relatively soft and pliable. This property is advantageous where the laminate preform is to be applied to a non-planar substrate having a different configuration than the initial configuration of the laminate preform. The laminate preform thereby can be easily shaped or manipulated to conform closely to the contours of the substrate. Upon curing, however, the thermosettable resin cross-links to provide the stiffness desired in rigid layer 5. At the same time, the uncured thermosettable resin formulation should be sufficiently viscous, thixotropic or solid such that the integrity of the laminate prior to application to the substrate and curing is maintained. A fully liquid thermoset resin having a low viscosity at normal storage or handling temperatures would have an undesirable tendency to leak or ooze out of the laminate preform. Ideally, therefore, the uncured rigid layer 5 should be dough-like or putty-like in consistency, i.e., capable of being readily deformed by hand, yet able to retain its shape when no longer being manipulated. Preferably, the uncured resin formulation does not flow at normal handling and storage temperatures (e.g., 20° C.–30° C.). Where low viscosity liquid or semi-liquid components are utilized in the formulation, it will generally be desirable to also incorporate solid fillers and/or thixotropic agents and/or thickeners in order to achieve the desired consistency.

While any thermosettable resin known in the art which can be cured to form a hard, stiff polymer may be utilized as a precursor to rigid layer 5 in the present invention, the use of epoxy resin-based systems is particularly preferred. Any of the thermosettable resins having an average of more than one (preferably, two or more) epoxy groups per molecule known or referred to in the art may be utilized.

Epoxy resins are described, for example, in the chapter entitled "Epoxy Resins" in the Second Edition of the *Encyclopedia of Polymer Science and Engineering,* Volume 6, pp. 322–382 (1986). Exemplary epoxy resins include polyglycidyl ethers obtained by reacting polyhydric phenols such as bisphenol A, bisphenol F, bisphenol AD, catechol, resorcinol, or polyhydric alcohols such as glycerin, sorbitol, 1,4-butanediol and polyalkylene glycols with haloepoxides such as epichlorohydrin; glycidylether esters obtained by reacting hydroxycarboxylic acids such as p-hydroxybenzoic acid or beta-hydroxy naphthoic acid with epichlorohydrin or the like; polyglycidyl esters obtained by reacting polycarboxylic acids such as phthalic acid, tetrahydrophthalic acid or terephthalic acid with epichlorohydrin or the like; epoxidated phenolic-novolac resins (sometimes also referred to as polyglycidyl ethers or phenolic novolac compounds); epoxidated polyolefins; glycidylated aminoalcohol compounds and aminophenol compounds, hydantoin diepoxides and urethane-modified epoxy resins. Mixtures of epoxy resins may be used if so desired; for example, mixtures of liquid (at room temperature), semi-solid, and/or solid epoxy resins can be employed. Any of the epoxy resins available from commercial sources are suitable for use in the present invention. Preferably, the epoxy resin has an epoxide equivalent molecular weight of from about 150 to 1,000. The use of epoxy resins based on glycidyl ethers of bisphenol A is especially advantageous. The epoxy resin(s) preferably have an average of about 2 epoxy groups per molecule, although higher functionality epoxy resins may be used where a higher degree of cross-linking is desired. The epoxy resins or resins should be selected so as to provide the desired combination of properties in both the laminate preform and the final cured laminate.

The hardening of the thermosettable epoxy utilized in the present invention may be accomplished by the addition of any chemical materials known in the art for curing such resins. Such materials are referred to herein as "curatives", but also include the substances known to workers in the field as curing agents, hardeners, activators, catalysts or accelerators. While certain curatives promote epoxy resin curing by catalytic action, others participate directly in the invention of the resin and are incorporated into the thermoset polymeric network formed by condensation, chain-extension and/or cross-linking of the epoxy resins.

It is particularly desirable to employ at least one curative which is a nitrogen-containing compound. Such curatives (along with other curatives useful for hardening epoxy resins) are described in the chapter in the *Encyclopedia of Polymer Science and Engineering* referenced herein. Latent thermally triggered curatives (i.e., compounds which initiate curing of the epoxy resin only when heated above a certain temperature) are especially preferred. Suitable nitrogen-containing compounds useful as curatives include amino compounds, amine salts, and quaternary ammonium compounds. Particularly preferred types of nitrogen-containing compounds include amine-epoxy adducts and guanidines. In one desirable embodiment of the invention, two or more different types of these nitrogen-containing compounds are used in combination.

Amine-epoxy adducts are well-known in the art and are described, for example, in U.S. Pat. Nos. 3,756,984, 4,066,625, 4,268,656, 4,360,649, 4,542,202, 4,546,155, 5,134,239, 5,407,978, 5,543,486, 5,548,058, 5,430,112, 5,464,910, 5,439,977, 5,717,011, 5,733,954, 5,789,498, 5,798,399 and 5,801,218, each of which is incorporated herein by reference in its entirety. Such amine-epoxy adducts are the products of the reaction between one or more amine compounds and one or more epoxy compounds. Carboxylic acid anhydrides, carboxylic acids, phenolic novolac resins, water, metal salts and the like may also be utilized as additional reactants in the preparation of the amine-epoxy adduct or to further modify the adduct once the amine and epoxy have been reacted. Preferably, the adduct is a solid which is insoluble in the epoxy resin component of the present invention at room temperature, but which becomes soluble and functions as an accelerator to increase the cure rate upon heating. While any type of amine would be used (with heterocyclic amines and/or amines containing at least one secondary nitrogen atom being preferred), imidazole compounds are particularly preferred. Illustrative imidazoles include 2-methyl imidazole, 2,4-dimethyl imidazole, 2-ethyl-4-methyl imidazole, 2-phenyl imidazole and the like. Other suitable amines include, but are not limited to, piperazines, piperidines, pyrazoles, purines, and triazoles. Any kind of epoxy compound can be employed as the other starting material of the adduct, including monofunctional, bifunctional, and polyfunctional epoxy compounds such as those described previously with regard to the epoxy resin component. Suitable amine-epoxy adducts are available from commercial sources such as Ajinomoto, Inc., Shell, Pacific Anchor Chemical Company, and the Asahi Chemical Industry Company Limited. The products sold by Ajinomoto under the trademarks "AJICURE PN-40" and "AJICURE PN-23" are especially preferred for use in the present invention.

Dicyandiamide (sold commercially by Air Products under the trademark "DICY") is also a particularly preferred curative, although other guanidine compounds may also be utilized. The curative system may also comprise one or more ureas, either alone or in combination with other types of curatives (especially guanidines such as dicyandiamide). Suitable ureas include alkyl and aryl substituted ureas. Many such ureas are available commercially, for example, N,N'-dimethyl urea, which is sold under the trademark "AMICURE UR" by Air Products. Imidazoles such as 2-ethyl-4-methyl imidazole may also be used as curatives.

The curative system (i.e., the specific curatives and the amounts of such curatives) should be selected such that it does not catalyze curing of the epoxy resin in the laminate preform to any significant extent under typical storage conditions over an extended period of time. Preferably, the components of the curative system are adjusted such that the epoxy resin formulation retains a workable consistency (in one embodiment of the invention, a consistency resembling that of a pliable dough or putty) for more than two weeks in storage at 130 F. (54° C.) and does not expand in volume or decrease in specific gravity under such conditions to an unacceptable extent, yet cures within 10 minutes upon being heated at 150° C. or higher to provide a rigid layer comparable in properties to those of a rigid layer obtained from a freshly prepared composition.

In a particularly desirable embodiment, the rigid layer is foamed. Selection of the blowing agent or blowing agents to be used in the present invention is not believed to be particularly critical, although chemical blowing agents in general (particularly those activated by heating) are preferred over physical blowing agents. Any of the chemical blowing agents known in the art may be employed, with azodicarbonamide (also sometimes referred to as 1,1'-azobisformamide, AZDC, or ADC) and sulfonyl hydrazides providing particularly good performance. Azodicarbonamide is available from a number of commercial sources; for example, it is sold under the trademark UNICELL by Doug Jin Chemical of South Korea and under the CELOGEN trademark by Uniroyal Chemical. "Activated" or "modified" forms of azodiacarbonamide may be used to advantage. In some formulations, it may be desirable to also use a blowing agent accelerator (activator) so as to lower the temperature at which release of the gas from the blowing agent takes place. Typically, about 0.05% to about 2% blowing agent accelerator based on the overall weight of the thermosettable resin formulation is employed, although the optimum amount will, of course, vary depending upon the accelerator selected, the amount of blowing agent, cure temperature and other variables. Excess accelerator should not be present in the thermosettable resin formulation, however, since the storage stability may be undesirably compromised.

It will be especially desirable to include one or more glass fillers in the epoxy resin formulation which is a precursor to the rigid layer, as such fillers have been found to impart useful characteristics to the resulting rigid layer (especially where it is to be used to reinforce or stiffen a substrate). For example, hollow glass microspheres may be added to reduce the density of the rigid layer and thus the overall weight of the reinforced substrate while maintaining good stiffness and strength. Commercially available glass microspheres (sometimes also referred to as glass microballoons or microbubbles) include the materials sold by Minnesota Mining and Manufacturing under the trademark SCOTCHLITE, with suitable grades including those sold under the designations B38, C15, K20 and VS 5500. The glass microspheres preferably have diameters in the range of from about 5 to about 200 microspheres (preferably, less than about 70 micrometers). The crush strength of the hollow glass microspheres may be selected in accordance with the desired characteristics of the cured laminate or reinforced substrate having the cured laminate adhered thereto. Microspheres having a crush strength in excess of 500 psi are typically employed, however. Glass fiber is another preferred type of glass filler, since it helps increase the strength and stiffness of the resulting rigid layer. The glass fiber may be chopped, milled or in other physical forms.

Other types of fillers may also be optionally present in the epoxy resin formulation. Any of the conventional inorganic or organic fillers known in the thermosettable resin art may be used including, for example, fibers other than glass fibers (e.g. wollastinite fibers, carbon fibers, ceramic fibers, aramid fibers), silica (including fumed or pyrogenic silica, which may also function as a thixotropic or rheological control agent), calcium carbonate (including coated and/or precipitated calcium carbonate, which may also act as a thixotropic or rheological control agent, especially when it is in the form of fine particles), alumina, clays, sand, metals (e.g., aluminum powder), microspheres other than glass microspheres (including thermoplastic resin, ceramic and carbon microspheres, which may also be solid or hollow, expanded or expandable), macrospheres, and any of the other organic or inorganic fillers known in the epoxy resin field.

Other optional components include diluents (reactive or non-reactive) such as glycidyl ethers, glycidyl esters, acrylics, solvents, and plasticizers, toughening agents and flexibilizers (e.g., aliphatic diepoxides, polyaminoamides, liquid polysulfide polymers, rubbers including liquid nitrile rubbers such as butadiene-acrylonitrile copolymers, which may be functionalized with carboxyl groups, amine groups or the like), adhesion promoters (also known as wetting or coupling agents; e.g., silanes, titanates, zirconates), colorants (e.g., dyes and pigments such as carbon black), stabilizers (e.g., antioxidants, UV stabilizers), and the like.

The epoxy resin formulations used to form the rigid layer of the laminate of the present invention preferably contain the above-discussed components in the following amounts (expressed as a percentage of the total weight of the epoxy resin formulation).

| Component | Preferred | More Preferred |
|---|---|---|
| Epoxy Resin(s) | about 35–85 | about 40–70 |
| Blowing Agent(s) | about 0.1–5 | about 0.5–3 |
| Curative(s) | about 0.1–10 | about 1–8 |
| Filler(s) | about 5–60 | about 20–45 |
| Adhesion Promoter(s) | up to about 2 | about 0.001–0.5 |
| Colorant(s) | up to about 2 | about 0.01–1 |
| Toughening/ Flexibilizing Agents | up to about 15 | about 0.05–10 |
| Blowing Agent Accelerator(s) | up to about 3 | about 0.05–2 |
| Stabilizer(s) | up to about 2 | about 0.01–1 |

Preferably, epoxy resin is present in an amount which is greater than the amount of any of the other components in the epoxy resin formulation.

The above-described ingredients may simply be combined and mixed to form the epoxy resin formulation using any of the processing methods known in the epoxy resin art.

The preferred finished product preferably has the consistency of dough for easier handling. The dough may be shaped by extrusion, by hand, or by cutting means into any desired configuration, thickness or size. For example, the dough may be extruded to a wide, flat continuous ribbon which can then be cut to a desired length and applied to the surface of a carrier or the compliant layer.

Further details concerning preferred thermosettable resin formulations suitable for use in the present invention may be found in the following patents and applications, each of which is incorporated herein by reference in its entirety: U.S. Pat. Nos. 4,751,249, 4,769,391, 4,836,516, 4,908,930, 4,853,270, 4,861,097, 4,901,500, 4,922,596, 4,923,902, 4,995,545, 4,978,562, 5,124,186, 5,575,526, 5,884,960, 5,755,486, and 5,888,600, European Patent Publication Nos. EP 893,331, EP 891,918, and EP 893,332, and International (PCT) Patent Publication Nos. WO 97/43501 and WO 99/08854.

Particularly preferred Thermosettable resin formulations include the foamable epoxy resin-based materials sold by The Surface Technologies Division of Henkel Corporation under the trademark TEROCORE such as TEROCORE 1010A, TEROCORE 1010B, TEROCORE 1020, and TEROCORE 1020B.

Where a carrier layer is utilized as part of the laminate, said layer can be comprised of any suitable material such as, for example, fiberglass cloth (i.e., a glass fiber mat), metal or polymeric screen, metal or polymeric sheet, or metal or polymeric foil. The use of an aluminum foil as the carrier layer material is especially preferred, since aluminum has a high modulus and thus serves as an effective supplemental reinforcement in the laminate. Being bendable and yet somewhat stiff, a foil comprised of aluminum also will assist in making the laminate preform capable of retaining its shape once it has been conformed to the contours of the surface of a substrate. The carrier layer is preferably selected to be sufficiently flexible to permit the laminate preform to be readily shaped to follow the contours of the substrate surface to which it is being applied. Another benefit provided by the carrier layer is to render at least one side of the laminate preform non-tacky, thereby allowing the laminate preform to be more easily manipulated, handled and stored than may be the case in the absence of the carrier layer, particularly where the thermosettable resin serving as the precursor to the rigid layer is based on a liquid or semi-solid component such as a low molecular weight diglycidyl ether of a bisphenol. If the carrier layer contains openings, such as would be found in a screen, the rigid layer precursor may penetrate into or through such openings, resulting in the carrier layer becoming an integral part of the rigid layer.

A release paper or other covering separable from the thermosettable resin formulation may be used in place of the carrier layer and removed from the laminate preform once the laminate preform is positioned on the substrate.

The compliant layer is comprised of a flexible, pliant polymer. The chemical composition of the polymer is not believed to be particularly critical and any of a number of different rubbery, elastic (elastomeric) or viscoelastic materials known in the art may be selected for this purpose. The polymer may be thermoplastic in character, although generally it will be preferred to employ a thermosettable polymer which cross-links and cures when the laminate preform is heated. While the compliant layer may be solid (i.e., unfoamed), in one desirable embodiment of the invention the flexible, pliant polymer is foamed. Foaming may be achieved using physical blowing agents such as volatile hydrocarbons and halogenated hydrocarbons. Chemical blowing agents activated by heat, such as those discussed in connection with the rigid layer of the present invention, may also be used to advantage. Selection of the blowing agent(s) and curing agent(s) should be coordinated such that foaming and curing take place within approximately the same temperature range.

Materials suitable for use in forming the compliant layer include, but are not limited to, natural rubber, neoprene rubber, isoprene rubber, butadiene rubber, styrene-butadiene rubber and other butadiene rubbers, brominated isobutylene-isoprene rubber, chloroprene rubber, butadiene-acrylonitrile rubber, isoprene-acrylonitrile rubber and other diene-based specialty rubbers, butyl rubber, ethylene-propylene rubbers, acrylic rubbers, halogenated butyl rubbers, urethane rubbers, hydrin rubbers, ethylene-acrylate copolymers, ethylene-propylene-diene rubbers, polysulfide rubbers, silicone rubbers, fluorine rubbers, polyethylene chloride and combinations thereof. Liquid, solid, and mixtures of liquid and solid rubbers may be utilized. Diene rubbers, i.e., polymers obtained by polymerization of conjugated dienes such as butadiene or isoprene (either alone or in combination with other co-monomers) are particularly preferred for use. The rubbers may contain functional groups such as hydroxy, amino, carboxyl, carboxylic anhydride, or epoxy groups, which may be terminal and/or pendent to the polymer backbone. Such polymers may be incorporated into the laminate in vulcanized form prior to application of the laminate to the substrate and curing of the adhesive composition and thermosettable resin. Alternatively, such polymers may be unvulcanized or partially unvulcanized when the laminate preform is initially constructed, then cross-linked or otherwise cured at the same time as the adhesive composition and thermosettable resin to provide the laminate in its final form containing the rigid layer derived from the thermosettable resin and the adhesive layer derived from the adhesive composition. Any of the conventional cross-linking or vulcanizing agents known in the art may be used for such purpose including, for example, peroxides, sulfur (which may be used in combination with vulcanization accelerators) and the like.

The flexible, pliant polymer should be selected to be a material which prior to vulcanization or cross-linking is capable of easily changing shape and following the shape or contours of the substrate to give close contact between the laminate preform and the substrate, even if the substrate surface to which the laminate preform is to be applied is uneven or contains protrusions or recessed areas. The viscosity or elasticity of the polymer thus should not be excessive. This will permit the laminate to be readily conformed to the substrate surface. One advantage of using a foamable polymer for the compliant layer, however, is that any gaps which might exist between the laminate preform and the substrate surface when the laminate preform is initially applied will tend to be filled as the polymer expands during foaming. At the same time, however, care should be taken not to utilize a polymer which has a viscosity which is too low, since this may make assembly of the laminate preform difficult and interfere with the workability of the laminate preform. Preferably, the composition used to form the compliant layer does not flow at normal handling and storage temperatures (e.g., 20° C.–30° C.). Thixotropic agents such as fumed silica and the like may be used to modify the flow properties of the compliant layer.

The compositions used to form the compliant layer may contain, in addition to one or more vulcanizable or cross-linkable rubbers or elastomers, blowing agents, and vulcanizing/cross-linking agents, other components such as, for example, thermoplastic polymers (e.g., polyethylene, ethylene/vinyl acetate copolymer, ethylene/propylene copolymer), colorants (e.g., carbon black), fillers and thixotropic agents (e.g., calcium carbonate, calcium oxide, finely divided silica), thermosettable resins other than the vulcanizable rubbers (e.g., phenolic resins, epoxy resins), diluents or extender oils (e.g., petroleum hydrocarbons), plasticizers, tackifiers, stabilizers, and the like. Relatively high loadings of filler can improve the sound dampening characteristics of the laminate. Adjusting the glass transition temperature to approximately room temperature (e.g., 20° C.–25° C.) by the use of plasticizers may further enhance the ability of the laminate to suppress acoustic vibrations. In one preferred embodiment of the invention, the composition serving as the precursor to the compliant layer is a foamable, vulcanizable material corresponding to the following formulation:

| Component | Wt. % |
|---|---|
| Vulcanizable Diene-Based Rubber(s) | 5–50 |
| Thermoplastic Polymer(s) | 0.5–50 |
| Colorant(s) | 0.1–5 |
| Filler(s)/Thixotropic Agent(s) | 10–50 |
| Other Thermosettable Resin(s) | 1–25 |
| Vulcanization Agent(s) | 0.05–5 |
| Blowing Agent(s) | 0.05–5 |

Such compositions are well known to workers in the field and may be readily obtained from commercial sources, such as Multiseal Inc. of Evansville, Ind. Materials suitable for use in preparing the compliant layer of the present invention are described, in the following patents and applications, each of which is incorporated herein by reference in its entirety: WO 96/23040, U.S. Pat. No. 5,356,994, U.S. Pat. No. 5,256,738, EP 097,394, CA 2,000,569, EP 309,903, EP 496,864, U.S. Pat. No. 4,600,745, U.S. Pat. No. 4,824,512, and U.S. Pat. No. 5,149,742.

The present invention utilizes a reactive thermosettable adhesive composition comprised of at least one polyol, at least one epoxy resin, and at least one polyisocyanate to form, when cured, the layer securing the compliant layer to the substrate. Adhesive compositions of this type, which may alternatively be described as epoxy-modified polyurethanes, polyurethane-modified epoxides, or urethane epoxy hybrid resins, have been found to be unusually effective in creating an adhesive bond between the substrate and the compliant layer, particularly when the substrate surface contains residual oil or the like. Use of such a reactive thermosettable adhesive composition also tends to further reduce the extent of warpage, distortion or paint read-through in the substrate as compared to an analogous laminate without the adhesive and provides improved protection against corrosive agents in the environment.

The adhesive composition is capable of being cured by application of heat to provide a cross-linked polymer matrix. In its uncured state, the adhesive composition may be in the form of a hotmelt, i.e., a solventless material which is solid or semi-solid at room temperature and which sufficiently liquifies upon heating to a moderately elevated temperature so that it may be easily applied to the surface of the material to which it is to be bonded (e.g., the surface of the compliant layer and/or the surface of the substrate). It is also desirable for the adhesive composition in its uncured state to be pressure sensitive, i.e. sufficiently to dry to adhere spontaneously to a surface under only light pressure.

Adhesive compositions meeting such criteria are known in the art and are available from commercial sources. The adhesive compositions sold by Henkel KGaA and Henkel Corporation under the trademark TEROREHM, such as TEROREHM 100 are, particularly suitable for use in the present invention. Other suitable adhesive compositions are described in U.S. Pat. Nos. 4,962,138, 5,079,094, 4,613,660, 4,401,499, 5,202,391, 4,206,299, 4,077,921, and 4,843,119, each of which is incorporated herein by reference in its entirety.

The term "polyol" is used herein to refer to those higher molecular weight substances containing at least two active hydrogens per molecule known in the art to be useful for reacting with polyisocyanates to form polyurethanes. The polyol generally forms the so-called "soft segments" in the polyurethane chains. The active hydrogens are most preferably in the form of hydroxyl groups, preferably primary or secondary hydroxyl groups, although amine-functionalized polyoxyalkylenes may also be used. Preferred polyols are oligomeric or polymeric in character and contain a plurality of repeating units derived from one or more monomers. While polyether polyols are generally most preferred for use, other types of suitable polyols include polyester polyols, polyether ester polyols, polyester amide polyols, acrylic polyols, polyhydroxyalkanes, hydroxy-terminate polybutadienes, castor oil (and other polyhydroxy triglycerides and derivatives thereof, and mixtures of these. In preferred embodiments of the invention, the polyol contains 2–6, preferably 24, active hydrogen groups (e.g., hydroxyl groups), a number average molecular weight of greater than 200 to about 50,000, preferably about 300 to about 10,000, and an acid value about 0 to about 100 mg KOH/g, preferably about 0 to about 50 mg KOH/g.

Examples of suitable polyether polyols are polyether polyols obtainable by polymerizing an oxirane compound, such as ethylene oxide, propylene oxide, butylene oxide, oxetane or tetrahydrofuran, with water or a low-molecular-weight polyol, such as ethylene glycol, propylene glycol, trimethylolpropane or glycerin, as an initiator. The oxirane compounds may be copolymerized in a block or random manner. For example, propylene oxide may be polymerized to form a polypropylene glycol which is then reacted with ethylene oxide to provide an end-capped polyether polyol with primary hydroxyl end groups. Mixtures of different polyether polyols may also be used to advantage.

Any of the isocyanate compounds known in the art which contain two or more isocyanate (NCO) groups per molecule may be utilized as the polyisocyanate component of the adhesive composition. Aromatic diisocyanates are particularly preferred, including, for example, diphenyl methane diisocyanates (MDI, including the 4,4', 2,4', and other isomers, either in pure form or as mixtures; the crude polymeric or oligomeric forms of MDI, sometimes referred to as PMDI are also useable), phenylene diisocyanates, toluene diisocyanates (including the 2,4, or 2,6 isomers or mixtures thereof), diphenyl diisocyanates, toluidine diisocyanates, dianisidine diisocyanates, diphenyl ether diisocyanates, and the like. Also suitable for use, however, are alkylene diisocyanates (e.g., hexamethylene diisocyanates), cycloaliphatic diisocyanates (e.g., methylene bis(cyclohexyl isocyanate)), aromatic-aliphatic diisocyanates (e.g., xylene diisocyanate), aromatic triisocyanates, aromatic tetraisocyanates, dimers or trimers or biurets or allophonates derived from the aforementioned monomeric polyisocyanates or others, 2,4,6-oxadiazinetrione ring-containing polyisocyanates obtainable from carbon dioxide and the aforementioned monomeric polyisocyanates, and products of addition of the aforementioned polyisocyanates to low molecular weight (<200) polyhydroxy compounds such as glycols (so-called "modified" polyisocyanates).

The epoxy resin component of the adhesive composition may be any organic compound which contains at least one, and preferably at least about two, epoxy groups per molecule. It is preferred to use at least one epoxy resin having at least about two epoxy groups per molecule. Preferably, at least one of the epoxy resins also contains at least one hydroxyl group. Hydroxyl-containing epoxy resins may be used either alone or in combination with epoxy resins which do not contain hydroxyl groups.

Epoxy resins are well-known in the art and are described, for example, in the *Encyclopedia of Polymer Science and Engineering,* (Volume 6, pp. 322–382, 1986) in the chapter entitled "Epoxy Resins". One particularly preferred class of epoxy resins includes the products obtained by reaction of polyhydric phenols such as bisphenol A, bisphenol F, bisphenol AD, or tetrahydroxydiphenyl ethane with polyfunctional halohydrins such as epichlorohydrin. By controlling the mole ratio of halohydrin to polyhydric phenol, the physical and chemical characteristics of the resulting epoxy resin may be readily controlled. Lower molecular weight epoxy resins of this type tend to be liquid, with the melting point increasing as the degree of condensation (i.e., molecular weight) is increased. Solid, semi-solid, as well as liquid epoxy resins or mixtures thereof may be utilized. Typical epoxide equivalent weights range from about 170 to about 1,000. Other epoxy resins suitable for use in the present invention include, but are not limited to, the dimer fatty acid extended diglycidyl ethers of polyhydric phenols wherein two molecules of a polyhydric phenol diglycidyl ether (e.g., the diglycidyl ether of bisphenol A) are linked together by means of a dimer fatty acid. This type of epoxy resin is available from Shell Chemical under the trademark EPON 872. In one desirable embodiment of the invention a dimer fatty acid extended diglycidyl ether of a polyhydric phenol is used in combination with a solid polyhydric phenol diglycidyl ether.

The adhesive composition preferably also contains one or more substances capable of catalyzing or otherwise accelerating the curing rate of the adhesive composition upon heating. Curing or hardening of the components of the adhesive composition is believed to involve reaction of the active hydrogen groups of the polyol with the isocyanate groups of the polyisocyanate and the epoxy groups of the epoxy resin. When the epoxy resin contains hydroxyl groups, such groups may also react with the isocyanate groups. Reaction of epoxide and isocyanate groups to form oxazolidine structures may also take place. The net result of such reactions is to form a thermoset polymer matrix. Any of the compounds, both organic and inorganic, known in the art to be capable of catalyzing or otherwise increasing the rate of such reactions may be utilized. The curing agent may also actually participate in the reaction and itself become incorporated into the thermoset polymer formed.

In one embodiment of the invention, a latent thermally triggered curing agent is used which is relatively inactive or dormant at normal storage temperatures, yet which upon heating to an elevated temperature effects the desired curing of the adhesive composition. Latent curing agents are well-known in the art and include guanidines such as dicyandiamide ( a particularly preferred latent curing agent), amine-epoxy adducts, boron trihalide amine complexes, urea derivatives, phenol novolac resins, adipic dihydrazide, diallyl melamine, amine salts, modified imidazole compounds, and the like.

It may additionally be desirable to include relatively low molecular weight compounds containing two or more active hydrogen groups such as hydroxyl or primary or secondary amines in the adhesive composition. Without wishing to be bound by theory, such compounds may function as chain extenders and/or curing agents in the desired hardening of the adhesive composition upon heating. Such compounds will typically have molecular weights ranging from about 62 to about 200 and may contain, for example, a total of 2 to 5 reactive amino and/or hydroxyl groups. Particularly preferred amino groups are primary aromatic and primary and secondary aliphatic amino groups. It is preferred that the hydroxyl groups be primary aliphatic hydroxyl groups. The low molecular weight compound may, for example, contain at least one hydroxyl group and at least one amino group, or at least two hydroxyl groups and no amino groups (a preferred embodiment), or at least two amino groups and no hydroxyl resins. Although the remainder of the compound may be carbon and hydrogen, other atoms such as nitrogen atoms (as in a tertiary amine, for example) may also be present. Illustrative examples include, but are not limited to, dialkanol amines such as diamines (e.g., ethylenediamine), aminoalcohols (e.g., phenyldiethanol amine, 2-aminoethanol, 3-amino-1-propanol, 2-amino-1-butanol, 2-amino-2-hydroxymethyl-1,3-propanediol), glycols (e.g., ethylene glycol, diethylene glycol, neopentyl glycol, 1,4-butanediol, 1,6-hexanediol), polyalcohols (trimethylol propane, glycerol, pentaerythritol), aromatic diols, and the like.

Other components of the adhesive composition may include fillers (including fillers such as silica which are capable of acting as thixotropic agents), colorants, reactive diluents, coupling agents (e.g., glycidyl trimethyl silane), other resins and polymers (e.g., phenolic resin, rubber), plasticizers, tackifiers, and the like.

The aforedescribed components are preferably present in the adhesive composition in the following amounts (in weight %, based on the adhesive Composition as a whole):

| Component | Preferred | More Preferred |
|---|---|---|
| Epoxy Resin(s) | 15–70 | 20–60 |
| Polyol(s) | 10–65 | 15–55 |
| Polyisocyanate(s) | 0.5–20 | 1–10 |
| Low Molecular Weight Polyfunctional Reactant(s) | 0–5 | 0.05–2 |
| Curing Agent(s) | 0–20 | 0.1–10 |
| Filler(s)/Thixotropic Agent(s) | 0–50 | 5–35 |

The components of the adhesive composition can be mixed all at once or, if so desired, be reacted in stages using a prepolymer approach. For example, the polyol may be first contacted with the polyisocyanate and the resulting reaction mixture thereafter combined with the epoxy resin. Alternatively, the epoxy resin (which in one embodiment contains hydroxyl groups as well as epoxide groups) may be first reacted alone with the polyisocyanate. The epoxy resin and polyol may also, of course, be combined simultaneously with the polyisocyanate.

Prior to curing, the adhesive composition in one embodiment contains pre-reacted polyols containing epoxy end groups or end caps.

The laminates of the present invention may be of any suitable size and shape. In one desirable embodiment, the laminate is of generally rectangular shape. One or more of the edges of the laminate may, however, be curved or otherwise non-straight in shape (such as, for example, having a sawtooth, wavy or zig-zag construction). In certain embodiments of the invention, the laminate may be "solid"; that is, having no apertures or other openings in any of the layers. In other embodiments, however, it may be desirable to punch or otherwise form holes through one or more of the layers. Using a laminate with one or more non-straight edges and one or more openings may help to further minimize problems with paint read-through, as explained in more detail in pending application Ser. No. 09/273,107, filed Mar. 19, 1999 (incorporated herein by reference in its entirety). Forming holes in the laminate may also be advantageous where one or more of the layers of the laminate preform is foamable, as such holes will permit gases derived from the blowing agent(s) to more readily escape from the laminate. This is particularly desirable where a material which is impermeable to the escaping gases is being utilized as the carrier layer component of the laminate.

The laminate preform may be assembled using any suitable method. For example, the composition employed to form the compliant layer may be extruded as a thin sheet onto a conveyor belt. The extruded thin sheet may then be passed under the die of a second extruder and the thermosettable resin formulation being used to form the rigid layer extruded as a second thin sheet onto the first thin sheet. A carrier layer such as aluminum foil may then be applied to the exposed surface of the rigid layer precursor and pressed into contact using a roller. On the opposite surface of the resulting "sandwich", the reactive thermosettable adhesive composition is applied as a thin coating using an appropriate method such as extrusion, blading, calendaring, rolling, brushing, spraying or the like, depending upon the viscosity and other physical characteristics of the adhesive composition. A release paper or other such material may then be used to cover the exposed surface of the adhesive composition until the laminate preform is ready to be applied to a substrate. The laminate may be assembled in a continuous manner or in the form of a large sheet or roll and thereafter cut or punched to the desired size and configuration.

To reinforce a substrate such as a vehicle door, roof, or hood comprised of metal sheeting, the surface of the laminate preform bearing the adhesive composition is placed in direct contact with the surface of the substrate (the release paper having first been removed, of course). If the uncured adhesive composition is sufficiently tacky at room temperature, no special techniques will generally be needed to cause the laminate preform to stick to the substrate surface sufficiently well to enable the substrate/laminate preform assembly to be further handled or transported prior to curing without risking separation of the substrate and laminate preform. Application of pressure, either manually or by use of tools such as rollers, may be desirable to closely conform the laminate preform to the contours of the substrate surface. Where the adhesive composition is a non-tacky hotmelt, however, it may be desirable to warm the substrate surface and/or the adhesive composition layer somewhat using hot air, heating blocks or the like prior to placing the adhesive composition surface in contact with the substrate surface. Mechanical means such as clamps or other positioning devices may also be used to hold the laminate preform in place against the substrate surface prior to curing.

The curing and foaming agents employed may be varied as needed to enable the laminate preform to be "activated" at a particular temperature or within a particular temperature range. It will be particularly advantageous and convenient to select the components of the different layers such that the laminate preform is fully cured and/or foamed under typical paint oven conditions (e.g., 120° C. to 220° C. for 5 to 90 minutes). Reinforcement of panels using the laminates of this invention thus may be readily integrated into standard vehicle production lines.

The laminate preform/substrate assembly is heated at a temperature effective to accomplish the desired curing and/or foaming of the components of the laminate preform, thereby creating a strong permanent adhesive bond between the substrate and the compliant layer of the laminate by means of the adhesive layer furnished by the reactive thermosettable adhesive composition The laminates of the present invention are useful for reinforcing panels used in industries other than the automotive industry. For example, appliances, furniture, aircraft, farm machinery, construction equipment and the like may be advantageously reinforced using the laminates described herein.

What is claimed is:

1. A laminate comprised of (a) a rigid layer derived from a thermosettable resin;

(b) a compliant layer comprised of a flexible pliable polymer;

(c) an adhesive layer derived from a reactive thermosettable adhesive composition comprised of at least one polyol, at least one epoxy resin, and at least one polyisocyanate;

wherein the compliant layer is located between the rigid layer and the adhesive layer.

2. The laminate of claim 1 additionally comprising a carrier layer secured to the rigid layer.

3. The laminate of claim 1 additionally comprising a substrate to which the adhesive layer is adhered.

4. The laminate of claim 1 wherein the thermosettable resin is comprised of an epoxy resin.

5. The laminate of claim 1 wherein the rigid layer is foamed.

6. The laminate of claim 1 wherein the compliant layer is comprised of a copolymer comprised of ethylene and vinyl acetate.

7. The laminate of claim 1 wherein the compliant layer is foamed.

8. The laminate of claim 1 wherein at least one epoxy resin is hydroxyl-substituted.

9. The laminate of claim 1 wherein the reactive thermosettable adhesive composition is a pressure sensitive hotmelt.

10. The laminate of claim 1 wherein the adhesive composition is cured using at least one latent thermally activated curing agent.

11. The laminate of claim 1 wherein at least one epoxy resin is a reaction product of epichlorohydrin and a polyphenolic compound.

12. The laminate of claim 1 wherein at least one polyol is a polyether polyol.

13. The laminate of claim 1 wherein at least one polyisocyanate is an aromatic diisocyanate.

14. The laminate of claim 1 wherein the adhesive layer is additionally comprised of at least one filler.

15. The laminate of claim 1 wherein the adhesive composition is additionally comprised of at least one compound having a molecular weight below 200 and containing at least two isocyanate-reactive groups selected from the group consisting of hydroxyl groups, primary amine groups, secondary amine groups, and combinations thereof.

16. The laminate of claim 1 wherein at least one epoxy resin is a glycidyl ether of a polyhydric phenol.

17. A laminate comprised of (a) a carrier layer;

(b) a rigid layer derived from a thermosettable resin comprised of an epoxy resin, said rigid layer being secured to said carrier layer;

(c) a compliant layer comprised of at least one vulcanized diene rubber secured to said rigid layer;

(d) an adhesive layer derived from a reactive thermosettable hotmelt adhesive composition comprised of at least one aromatic diisocyanate, at least one epoxy resin containing one or more hydroxyl groups and two or more epoxy groups per molecule and at least one latent thermally activated curative; and (e) a substrate to which the adhesive layer is secured.

18. The laminate of claim 17 wherein the carrier layer comprises a foil, mat or screen.

19. The laminate of claim 17 wherein the rigid layer is foamed.

20. The laminate of claim 17 wherein the compliant layer is foamed.

21. The laminate of claim 17 wherein the substrate is comprised of metal.

22. The laminate of claim 17 wherein the substrate is comprised of steel.

23. The laminate of claim 17 wherein the substrate is a vehicle panel.

24. The laminate of claim 17 wherein the rigid layer is comprised of a foam obtained by curing a mixture comprised of at least one epoxy resin, at least one blowing agent, at least one curing agent, and hollow glass microspheres.

25. A method of reinforcing a substrate comprising securing thereto the laminate of claim 1, the adhesive layer of the laminate being disposed directly against said substrate.

26. The method of claim 25 wherein the substrate is comprised of metal.

27. The method of claim 25 wherein the substrate is comprised of metal sheeting.

28. The method of claim 25 wherein the laminate additionally comprises a carrier layer secured to the rigid layer.

29. The method of claim 25 wherein the thermosettable resin is comprised of an epoxy resin.

30. The method of claim 25 wherein the rigid layer is foamed.

31. The method of claim 25 wherein the compliant layer is additionally comprised of at least one thermoplastic polymer.

32. The method of claim 25 wherein the compliant layer is foamed and cross-linked.

33. The method of claim 25 wherein at least one epoxy resin is hydroxyl-substituted.

34. The method of claim 25 wherein the adhesive composition is cured using at least one latent thermally activated curing agent.

35. The method of claim wherein at least one epoxy resin is a reaction product of epichlorohydrin and a polyhydric phenol.

36. The method of claim 25 wherein at least one polyol is a polyether polyol.

37. The method of claim 25 wherein at least one polyisocyanate is an aromatic diisocyanate.

38. The method of claim 25 wherein the adhesive composition is additionally comprised of at least one compound having a molecular weight below 200 and containing at least two isocyanate reactive groups selected from the group consisting of hydroxyl groups, primary amine groups and secondary amine groups.

39. The method of claim 25 wherein at least one epoxy resin is a dimer fatty acid extended glycidyl ether of a polyhydric phenol.

40. A method of reinforcing a metal panel comprising (a) placing in contact therewith a laminate preform comprised of (i) a carrier layer;

(ii) a first layer comprised of an epoxy resin secured to said carrier layer;

(iii) a second layer comprised of a vulcanizable diene rubber secured to said first layer; and (iv) a third layer comprised of a reactive thermosettable hotmelt adhesive composition comprised of at least one aromatic diisocyanate, at least one polyether polyol, at least one epoxy resin containing one or more hydroxyl groups and two or more epoxy groups per molecule, and at least one latent thermally activated curing agent wherein the adhesive layer is on one side in contact with the compliant layer and on another side in contact with the metal panel; and (b) heating the laminate preform at a temperature effective to cure the epoxy resin in the first layer to form a rigid layer, to cure the vulcanizable diene rubber to form a compliant layer, and to cure the reactive thermosettable hotmelt adhesive composition to form an adhesive layer.

41. The method of claim 40 wherein the carrier layer is comprised of a mat, screen, or foil.

42. The method of claim 40 wherein the metal panel comprises a vehicle door.

43. The method of claim 40 wherein the first layer is foamed during step (b).

44. The method of claim 40 wherein said temperature is from 120° C. to 220° C.

45. The method of claim 40 wherein the first layer is additionally comprised of at least one curing agent, at least one blowing agent, and hollow glass microspheres.

46. The method of claim 40 wherein at least one epoxy resin in the third layer is a diglycidyl ether of a bisphenol and at least one epoxy resin in the third layer is a dimer fatty acid-extended glycidyl ether of a polyhydric phenol.

47. The method of claim 40 wherein the adhesive composition is additionally comprised of at least one compound having a molecular weight below 200 and at least two isocyanate reactive groups selected from the group consisting of hydroxyl groups, primary amine groups and secondary amine groups.

48. A laminate preform comprised of (a) a first layer comprised of a thermosettable resin;

(b) a second layer comprised of a flexible pliable polymer or precursor thereof;

(c) a third layer comprised of a reactive thermosettable adhesive comprised of at least one polyol, at least one epoxy resin, and at least one polyisocyanate;

wherein the second layer is located between the first layer and the third layer.

49. The laminate perform of claim 48 additionally comprising a carrier layer secured to the first layer.

50. The laminate perform of claim 48 wherein the thermosettable resin is comprised of an epoxy resin.

51. The laminate preform of claim 48 wherein the first layer is foamable.

52. The laminate preform of claim 48 wherein the second layer is comprised of a copolymer comprised of ethylene and vinyl acetate.

53. The laminate preform of claim 48 wherein the second layer is foamable.

54. The laminate preform of claim 48 wherein at lest one epoxy resin in the third layer is hydroxyl-substituted.

55. The laminate preform of claim 48 wherein the reactive thermosettable adhesive is a pressure sensitive hot melt.

56. The laminate preform of claim 48 wherein the reactive thermosettable adhesive is additionally comprised of at least one latent thermally activated curing agent.

57. The laminate preform of claim 48 wherein at least one epoxy resin in the third layer is a reaction product of epichlorohydrin and a polyphenolic compound.

58. The laminate preform of claim 48 wherein at least one polyol in the third layer is a polyether polyol.

59. The laminate preform of claim 48 wherein at least one polyisocyanate in the third layer is an aromatic diisocyanate.

60. The laminate preform of claim 48 wherein the third layer is additionally comprised of at least one compound having a molecular weight below 200 and containing at least two isocyanate-reactive groups selected from the group consisting of hydroxyl groups, primary amine groups, secondary amine groups, and combinations thereof.

61. A laminate preform comprised of:

(a) a carrier layer;

(b) a first layer comprised of an epoxy resin, said first layer being secured to said carrier layer;

(c) a second layer comprised of a vulcanizable diene rubber; and (d) a third layer comprised of a reactive thermosettable hot melt adhesive composition comprised of at least one aromatic diisocyanate, at least one polyether polyol, at least one epoxy resin containing one or more hydroxyl groups and two or more epoxy groups per molecule, and at least one latent thermally activated curing agent;

wherein the second layer is between the first layer and the third layer.

62. The laminate preform of claim 61 wherein the carrier layer is comprised of a mat, screen or foil.

63. The laminate preform of claim 61 wherein the first layer is additionally comprised of at least one curing agent, at least one blowing agent, and hollow glass microspheres.

64. The laminate perform of claim 61 wherein at least one epoxy resin in the first layer is a diglycidyl ether of a bisphenol and at least one epoxy resin in the third layer is a dimer fatty acid-extended glycidyl ether of a polyhydric phenol.

* * * * *